(12) United States Patent
Sharma et al.

(10) Patent No.: US 10,511,179 B2
(45) Date of Patent: Dec. 17, 2019

(54) ENERGY STORAGE-AWARE DEMAND CHARGE MINIMIZATION

(71) Applicant: NEC Laboratories America, Inc., Princeton, NJ (US)

(72) Inventors: Ratnesh Sharma, Fremont, CA (US); Korosh Vatanparvar, Santa Clara, CA (US)

(73) Assignee: NEC Corporation (JP)

( * ) Notice: Subject to any disclaimer, the term of this patent is extended or adjusted under 35 U.S.C. 154(b) by 9 days.

(21) Appl. No.: 16/037,431

(22) Filed: Jul. 17, 2018

(65) Prior Publication Data

US 2019/0086983 A1 Mar. 21, 2019

Related U.S. Application Data

(60) Provisional application No. 62/560,231, filed on Sep. 19, 2017.

(51) Int. Cl.
*H02J 7/00* (2006.01)
*G06F 1/3206* (2019.01)
*G06Q 50/06* (2012.01)
*G06Q 10/04* (2012.01)
*G05B 13/04* (2006.01)
*H02J 3/00* (2006.01)
(Continued)

(52) U.S. Cl.
CPC .......... *H02J 7/0022* (2013.01); *G05B 13/021* (2013.01); *G05B 13/041* (2013.01); *G05B 13/042* (2013.01); *G05B 15/02* (2013.01); *G06F 1/3206* (2013.01); *G06Q 10/04* (2013.01); *G06Q 50/06* (2013.01); *H02J 3/00* (2013.01); *H02J 4/00* (2013.01); *H02J 7/0057* (2013.01); *H02J 7/0075* (2013.01); *H02J 7/0077* (2013.01); *H02J 2003/003* (2013.01); *H02J 2003/146* (2013.01); *Y04S 10/14* (2013.01); *Y04S 10/545* (2013.01); *Y04S 20/222* (2013.01); *Y04S 30/12* (2013.01)

(58) Field of Classification Search
CPC .. H02J 3/00; H02J 2003/003; H02J 2003/146; H02J 4/00; H02J 7/0021; H02J 7/0022; H02J 7/0057; H02J 7/0075; H02J 7/0077; G05B 13/021; G05B 13/042; G05B 15/02; G05B 19/042; G05B 19/048; G05B 2219/39361; G06Q 10/04; G06Q 10/06; G06Q 10/063; G06Q 10/0631; G06Q 10/06315; G06Q 10/0639; G06Q 50/06; Y04S 10/14; Y04S 10/54; Y04S 10/545; Y04S 20/12; Y04S 20/222; Y04S 30/12
See application file for complete search history.

(56) References Cited

U.S. PATENT DOCUMENTS 8,359,132 B2 * 1/2013 Laberteaux ............ G06Q 50/06 701/22
9,367,108 B2 * 6/2016 Asghari .................. G06F 1/26
(Continued)

*Primary Examiner* — Crystal J Barnes-Bullock
(74) *Attorney, Agent, or Firm* — Joseph Kolodka

(57) ABSTRACT

Systems and methods for power management include determining a demand threshold by solving an optimization problem that minimizes peak demand charges and maximizes a usable lifetime for a power storage system. Power is provided to a load from an electrical grid when the load is below the demand threshold and from a combination of the electrical grid and the power storage system when the load is above the demand threshold.

20 Claims, 5 Drawing Sheets

(51) Int. Cl.
*H02J 4/00* (2006.01)
*G05B 13/02* (2006.01)
*G05B 15/02* (2006.01)
*H02J 3/14* (2006.01)

(56) References Cited

U.S. PATENT DOCUMENTS

| | | | |
|---|---|---|---|
| 9,418,392 B2* | 8/2016 | Kearns | H02J 3/00 |
| 9,645,596 B1* | 5/2017 | Lee | G06Q 30/04 |
| 9,937,810 B2* | 4/2018 | Saussele | H02S 10/20 |
| 9,960,637 B2* | 5/2018 | Sanders | H02J 3/381 |
| 10,396,581 B2* | 8/2019 | Chandan | |
| 2012/0223578 A1* | 9/2012 | Bartelt-Muszynski | H02J 3/14 |
| | | | 307/24 |
| 2014/0058577 A1* | 2/2014 | Erhart | G05F 1/66 |
| | | | 700/297 |
| 2014/0088781 A1* | 3/2014 | Kearns | H02J 3/14 |
| | | | 700/295 |
| 2017/0310140 A1* | 10/2017 | Asghari | H02J 3/32 |
| 2018/0268327 A1* | 9/2018 | Hooshmand | G06Q 10/04 |
| 2019/0056451 A1* | 2/2019 | Asghari | H02J 3/383 |
| 2019/0137956 A1* | 5/2019 | Hooshmand | G05B 13/042 |
| 2019/0140465 A1* | 5/2019 | Hooshmand | H02J 7/0057 |
| 2019/0147552 A1* | 5/2019 | Nakayama | H02J 3/32 |

* cited by examiner

ENERGY STORAGE-AWARE DEMAND CHARGE MINIMIZATION

RELATED APPLICATION INFORMATION

This application claims priority to U.S. Application Ser. No. 62/560,231, filed on Sep. 19, 2017, incorporated herein by reference herein in its entirety.

BACKGROUND

Technical Field

The present invention relates to energy management and, more particularly, to peak demand optimization that accounts for energy storage system lifetime.

Description of the Related Art

Peak demand generally describes a period of simultaneous, strong consumer energy demand. Peak demand, (e.g., peak load) in terms of energy demand management describes a period in which electrical power is expected to be provided for a sustained period at a significantly higher than average supply level. Peak demand fluctuations may occur on daily, monthly, seasonal and yearly cycles. For an electric utility company, the actual point of peak demand may be a single 15-minutes, half-hour or hourly period which represents the highest point of customer consumption of electricity. At this time there may be, for example, a combination of office, domestic demand, and at some times of the year, the fall of darkness.

Many utility companies charge customers for energy based not only on the amount of energy used, but also the load demand during a monthly cycle. These values depend on the pattern of the customer load throughout the month. Utilities charge based on the peak power demand throughout the month, despite the fact that the average power demand is much lower. Conventional systems have attempted to reduce peak charges by, for example, setting a fixed threshold for user load, and if the load goes above this threshold, discharging the energy storage system. However, the use of energy storage systems presents its own set of costs, and maintaining a high state of charge with large battery throughput diminishes the battery capacity and shortens the battery's useful lifetime.

SUMMARY

A method for power management includes determining a demand threshold by solving an optimization problem that minimizes peak demand charges and maximizes a usable lifetime for a power storage system. Power is provided to a load from an electrical grid when the load is below the demand threshold and from a combination of the electrical grid and the power storage system when the load is above the demand threshold.

A method for power management includes determining a monthly demand threshold by solving an optimization problem, having a peak demand charge term, an average state of charge term, and an accumulated discharged energy term, that minimizes peak demand charges and maximizes a usable lifetime for a battery system. Power is provided to a load from an electrical grid when the load is below the monthly demand threshold and from a combination of the electrical grid and the battery system when the load is above the monthly demand threshold.

A power access system includes a monthly demand module configured to determine a demand threshold by solving an optimization problem that minimizes peak demand charges and maximizes a usable lifetime for a power storage system. A grid access controller is configured to provide power to a load from an electrical grid when the load is below the demand threshold and from a combination of the electrical grid and the power storage system when the load is above the demand threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles optimize the use of behind the meter (BTM) energy storage systems, balancing the reduction of monthly demand peaks against maximization of the battery's useful lifetime. To accomplish this, the present embodiments optimize on a monthly scale, for deciding the optimal monthly demand threshold, and a daily scale, for splitting customer load between the battery and the grid based on the monthly demand threshold. Particular embodiments implement the monthly layer using mixed-integer linear programming.

The electricity bills for most Commercial and Industrial (C&I) businesses is comprised of two main parts, namely consumption charges and demand charges. The present embodiments use an energy storage system that reduces the peak charges and manages energy storage system charge and discharge in a manner to minimize the peak charges and maximizes energy storage system's lifetime.

The present embodiments are adaptive to changes in user load profiles and can determine the optimal amount of peak charge reduction based on energy storage system capacity, load profile, and demand charge rates. The present principles may be employed to control energy storage system charge/discharge operations to reduce the peak charges for end users (e.g., energy customers). Furthermore, the present principles may be employed to minimize electric bills based on, for example, consumption energy charges and peak demand charges using BTM storage systems in accordance with the present principles. Thus, in accordance with various embodiments, the present invention advantageously enables end users to pay less for their peak demand charges, without reducing actual energy consumption and without unduly taxing the energy storage system.

Figure 1:
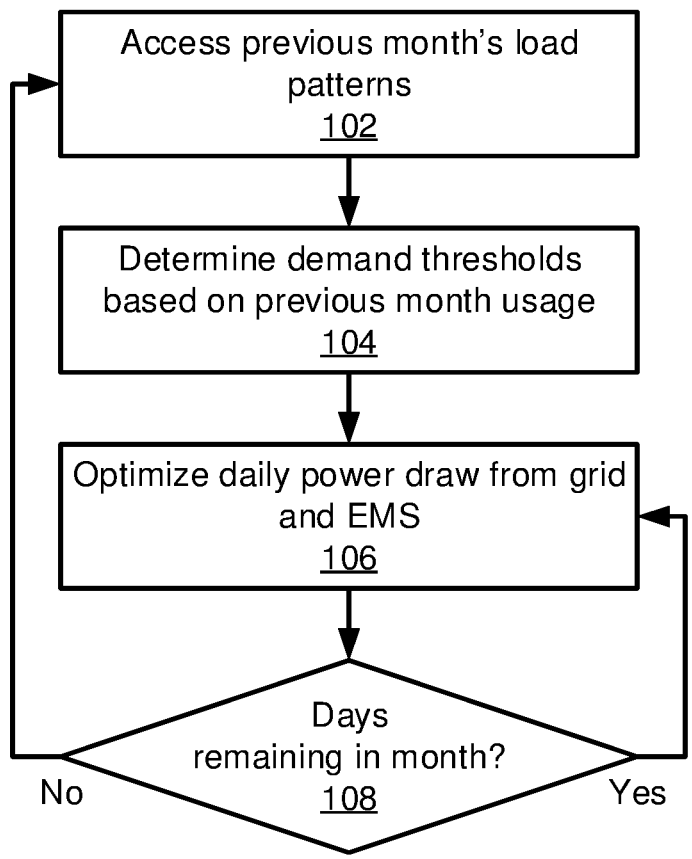
FIG. 1 is a block/flow diagram of a power management method that optimizes daily power use relative to a demand threshold that is selected to extend battery lifetime in accordance with an embodiment of the present invention.

Referring now to FIG. 1, a method of energy storage management is shown.

Block 102 accesses the actual load patterns from the previous month, including information relating to peak usage. Block 104 uses the previous month's energy usage to determine demand thresholds for the next month. Block 106 then, on a real-time or near-real-time basis, optimizes the power draw of the system by determining a proportion of power that is drawn from the grid versus drawn from the energy storage system. In occasions where the draw is below a threshold, block 106 may also charge batteries in the energy storage system to bring the battery state of charge to a threshold level.

The daily optimization of block 106 may, for example, make a determination whether the current load is greater than the demand threshold set by block 104. If so, block 106 accesses power from both the electrical grid and from battery storage, discharging the battery for as long as stored power remains in the battery. If the load is lower than the demand threshold, then block 106 accesses power solely from the electrical grid, optionally charging the battery as well with the difference between the load and the demand threshold.

Block 108 determines whether there is time remaining in the month. If so, processing returns to block 106 and the previously determined demand thresholds are used again to optimize the daily power draw. If not, then processing returns to block 102 and the usage patterns from the month that has just gone by are used to determine new demand thresholds for the upcoming month.

Following the monthly/daily framework described herein, block 104 represents the "monthly layer" while block 106 represents the "daily layer." Block 104 is thus run on a monthly basis, determining demand thresholds for each day in the upcoming month, based on the actual load measurements from the previous month.

Figure 2:
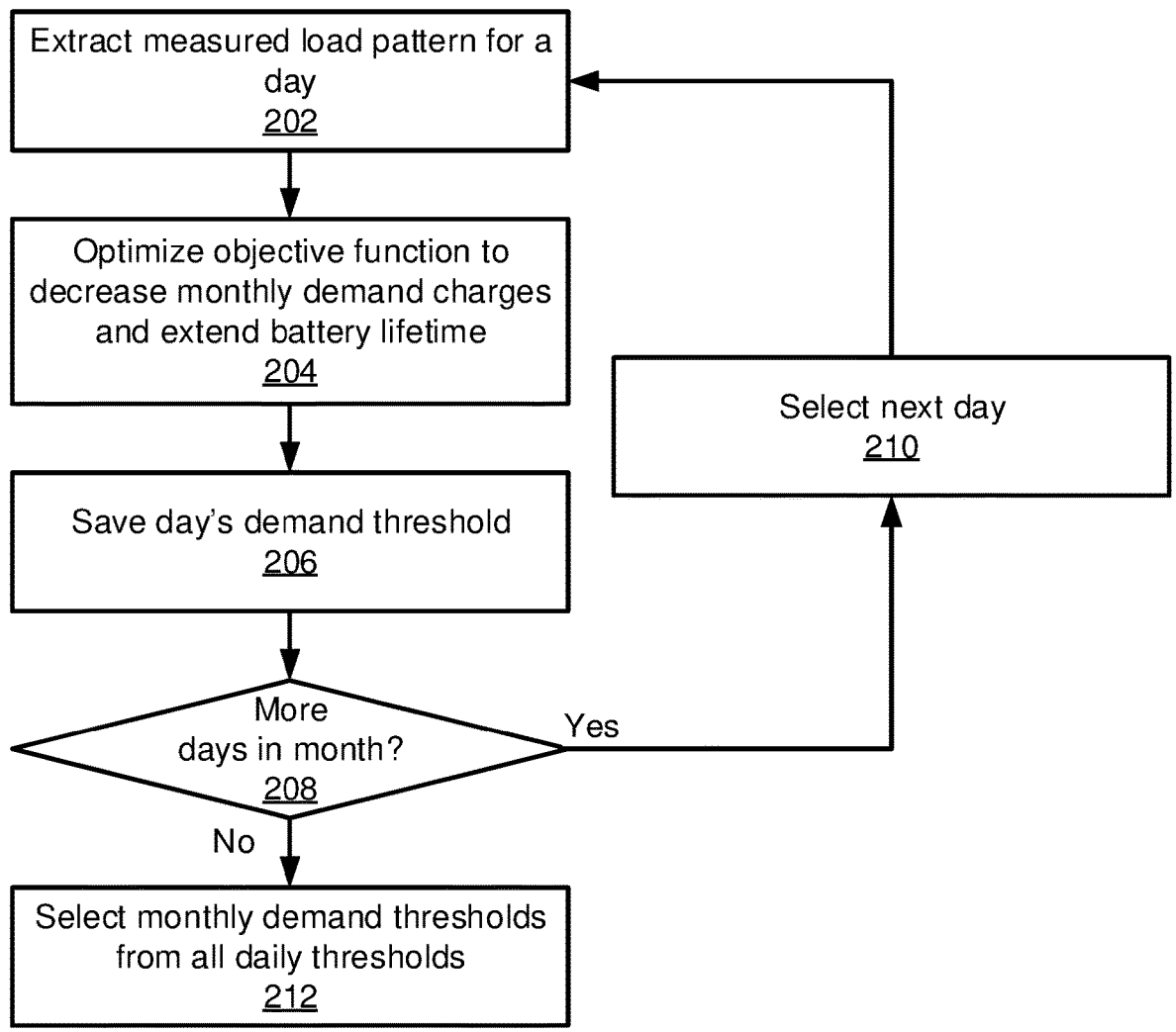
FIG. 2 is a block/flow diagram of a method for selecting demand thresholds that optimize daily power use and extend battery lifetime in accordance with an embodiment of the present invention.

Referring now to FIG. 2, additional detail on the monthly demand threshold determination of block 104 is shown. Block 202 extracts a measured load pattern for the first day of a month. Block 204 formulates an objective function with a set of constraints, to be explained in greater detail below, that is used to balance cost savings from lower peak charges with extending battery lifetime. Block 204 solves the objective function, for example using a combined or cascade approach, to determine a demand threshold for the day. Block 206 saves the optimized demand threshold.

Block 208 determines whether more days remain in the month. If so, block 210 selects the next day and processing returns to block 202, which extracts the measured load pattern for that day. If not, block 212 selects monthly demand threshold from the saved daily demand thresholds to be used for the upcoming month. The monthly demand threshold may be selected such that it is deterministic given the forecasting error of the load for the next month. In some embodiments, multiple demand thresholds may be selected to reflect different clusters of load behavior. For example, a first demand threshold may be selected for weekdays, a second demand threshold may be selected for weekends, and a third demand threshold may be selected for special events. These thresholds may be averaged to provide a single monthly demand threshold.

Following the above, some embodiments of the present invention use mixed-integer linear programming to optimize the demand thresholds. The optimization minimizes monthly demand charges while extending battery lifetimes, providing longer-term cost savings. The objective function is formulated to estimate demand threshold violations by considering demand thresholds as the optimization variables. The function therefore includes not only the peak grid power to reduce the demand charge, but also includes annual battery average state of charge and battery discharged energy as the most influential parameters in battery operating conditions. Thus, the objective function may be formulated as:

$$\min \sum_{i=1}^{T} \alpha [AvgSoC^i] + \beta [AADE^i] +$$

$$\gamma \left[ DC_{rate}^{any} \cdot P\max_{grid}^{any} + DC_{rate}^{peak} \cdot P\max_{grid}^{peak} + DC_{rate}^{partial} \cdot P\max_{grid}^{partial} \right]$$

In this function, the terms $\alpha$, $\beta$, and $\gamma$ are weighting parameters that that are set in accordance with a particular optimization method, whether combined or cascaded. T represents the number of days in a given month, while i represents a particular day of the month. $AvgSoC^i$ represents the $i^{th}$ average state of charge, $AADE^i$ represents the $i^{th}$ annual average discharged energy, $DC_{rate}$ refers to the demand cost at various periods of the day, and $P\max_{grid}$ provides the maximum value of the demanded power from the grid at various periods of the day. In each term, "any" refers to any time of day, "peak" refers to peak demand periods during the day, and "partial" refers to partial peak periods of the day. These periods are defined by the utility and are regarded as constant parameters.

The objective function is optimized subject to constraints on battery charging and discharging power, making it possible to model the exact behavior of the battery power during the daily layer. Thus, constraints on the optimization problem include a constraint to forbid over-charging and over-discharging:

$$SoC_{min} < SoC^i < SoC_{max}$$

where SoC refers to the state of charge in the battery. $SoC^i$ thus represents the value of the state of charge at a time i, with $SoC_{min}$ and $SoC_{max}$ representing limits on the value of the state of charge. A supply-load balance constraint is expressed as:

$$P_{grid}^i = P_{load}^i + P_{cha}^i + P_{dis}^i$$

where $P_{grid}$ is the power demanded from the grid, $P_{load}$ the power demanded by the is consumer, $P_{cha}$ is the power used to charge the battery, and $P_{dis}$ is the power discharging from the battery. A charge/discharge constraint is expressed as:

$$\text{if } (DT > P_{load}^i): P_{cha}^i = DT - P_{load}^i, P_{dis}^i = 0$$

$$\text{else: } P_{cha}^i = 0, P_{dis}^i = P_{load}^i - DT$$

where DT represents a monthly demand threshold. When the consumer demanded power is lower than the monthly demand threshold, the battery is charged by the rest of the available power from the grid up to the demand threshold. Otherwise, when the demanded power is higher than the monthly demand threshold, the grid provides up to the monthly demand threshold and the battery is discharged to provide the rest of the consumer power demand. A daily discharged energy constraint is expressed as:

$$\sum_{i=1}^{T} AADE^i < \Phi \times \text{Capacity}$$

This value is evaluated in the optimization problem, as the AADE is constrained to fully using the battery capacity a maximum of Φ times, which will extend the battery lifetime. The value of Φ relates to a value of annual discharged energy, beyond which the battery's lifetime is severely affected. In some exemplary battery systems, the value of Φ may be around 230.

Two different ways of solving the optimization problem are described below, but it should be understood that any appropriate approach may be used instead. The first takes a combined approach, where the objective function focuses on all three objectives (a low average state of charge, a low annual average discharged energy, and low demand charges) simultaneously. The weight coefficients (α, β, and γ) are adjusted to solve for all of the objectives at once. This minimizes the demand charge while reducing average state of charge and discharged battery energy, which extends the battery lifetime.

In the cascade approach, a two-level optimization is used for each day of the month. In a first step, only the monthly demand charges are addressed by setting a large value for γ compared to coefficients α and β. After determining the lowest possible demand charge setting, a limit on the demand charge is defined using the demand charge loss rate and the maximum demand charge for the load. The optimization next focuses on extending battery lifetime given the evaluated limit on the demand charge. The limit on the demand charge is enforced with a new constraint:

$$[DC_{rate}^{any} \cdot P\max_{grid}^{any} + DC_{rate}^{peak} \cdot P\max_{grid}^{peak} + DC_{rate}^{partial} \cdot P\max_{grid}^{partial}] < \text{LIMIT}$$

where the limit is a constraint on the demand charge and is defined using the demand charge loss rate and the demand charge for the load. The demand charge loss rate is arbitrarily defined by the customer, while the maximum demand charge for the load is evaluated in the first step of a cascade approach for finding a solution. The battery lifetime improvement is achieved by minimizing the annual battery average state of charge and discharged energy by giving large values for α and β compared to other cost function coefficients.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
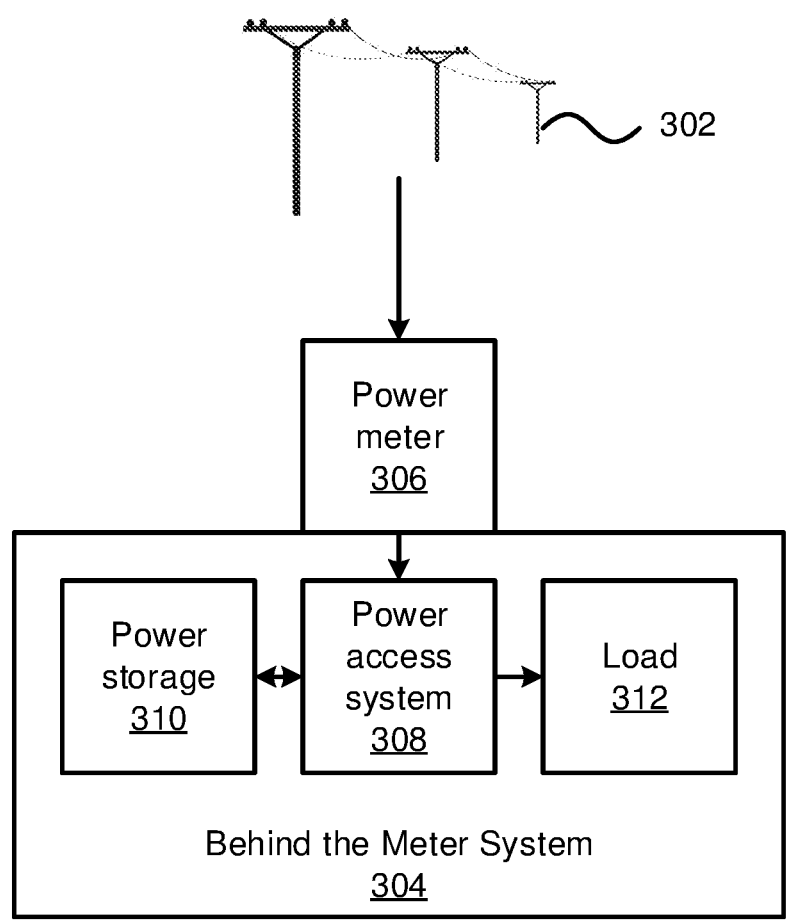
FIG. 3 is a block diagram of a behind-the-meter system that controls power draw from an electrical grid and manages a power storage system in accordance with an embodiment of the present invention.

Referring now to FIG. 3, a diagram of providing electrical power to a load 312 is shown. The electrical grid 302 is shown feeding a behind-the-meter system 304 via power meter 306, which measures electrical power demand. The behind-the-meter system 304 includes a load 312. The load 312 may represent any electrical load including, but not limited to, machinery, heating/cooling, lighting, computer systems, medical systems, electrical motors, etc. The load 312 presents a varying demand for electrical power to power access system 308.

Power access system 308, in turn, supplies power to the load 312 in the manner described above. In some embodiments, the power access system 308 sources power from the grid 302 and power storage 310, though it should be understood that other sources of electrical power are contemplated. Thus the power access system 308 may also access electrical power from, e.g., solar, wind, hydroelectric, geothermal, fossil fuel, and other forms of energy generation. Power access system 308 thus provides electrical power sufficient to meet the demand of load 312 with a combination of power from the grid 302 and the power storage 310, optimizing the balance between these sources to reduce the peak demands recorded at power meter 306 and to extend the usable lifetime of the power storage 310.

It is specifically contemplated that power storage 310 may be implemented in the form of one or more batteries, though it should be understood that other forms of power storage are also contemplated in the form of, e.g., capacitive storage or mechanical storage. In the case of battery storage, the power storage 310 will have electrical storage properties that degrade over time, for example losing charge capacity through use. Factors such as average state of charge and accumulated discharge energy influence the rate of degradation. At some point, a battery storage system will degrade beyond the point of usability and will need to be replaced. This maintenance cost can be modeled for other forms of power storage in a similar fashion.

Figure 4:
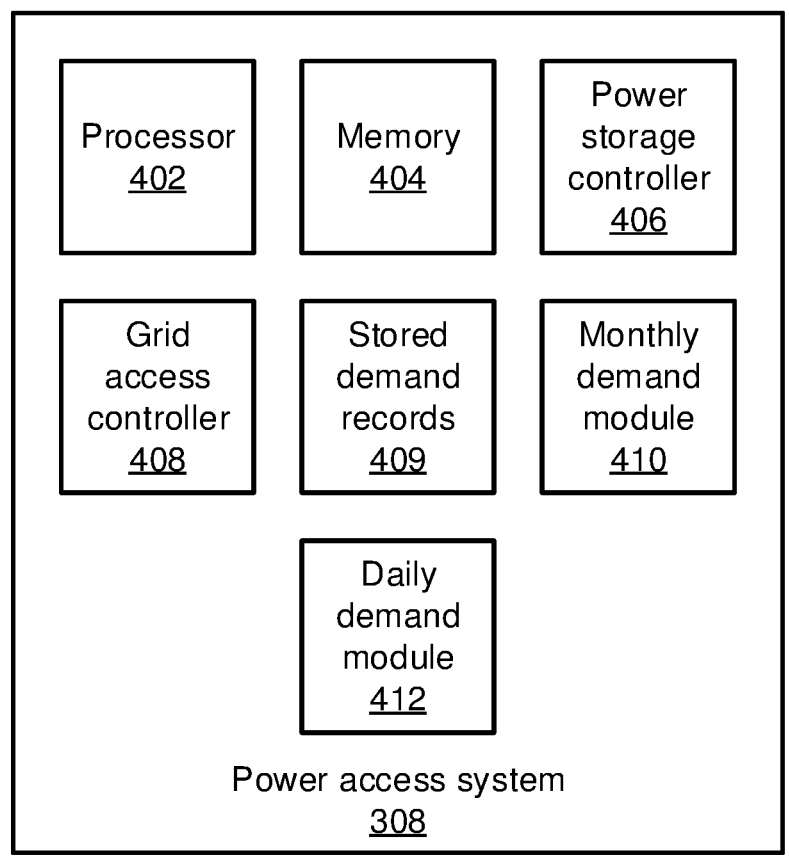
FIG. 4 is a block diagram of a power access system that optimizes daily power use relative to a demand threshold that is selected to extend battery lifetime in accordance with an embodiment of the present invention.

Referring now to FIG. 4, additional detail on the power access system 308 is shown. The power access system 308 includes a hardware processor 402 and memory 404. A power storage controller 406 interfaces with the power storage 310 and either charges or discharges the power storage 310, drawing power from the grid 302 to charge the power storage 310 and providing discharged power from power storage 310 to the load 312. A grid access controller 408 interfaces with the electrical grid 302 and draws power to meet the demand of load 312. The power access system further includes one or more functional modules that may be, in some embodiments, implemented as software that is stored in memory 404 and executed by processor 402. In other embodiments, the functional modules may be implemented as one or more discrete hardware components in the form of application-specific integrated chips or field programmable gate arrays.

A monthly demand module 410 uses stored demand records 409 to determine a demand threshold for the upcoming month by optimizing for low peak demand charges and long battery lifetime using, e.g., a combined or cascaded optimization approach. A daily demand module 412 then uses the demand threshold to make decisions regarding the amount of power to draw from the grid 302 and from power storage 310.

Figure 5:
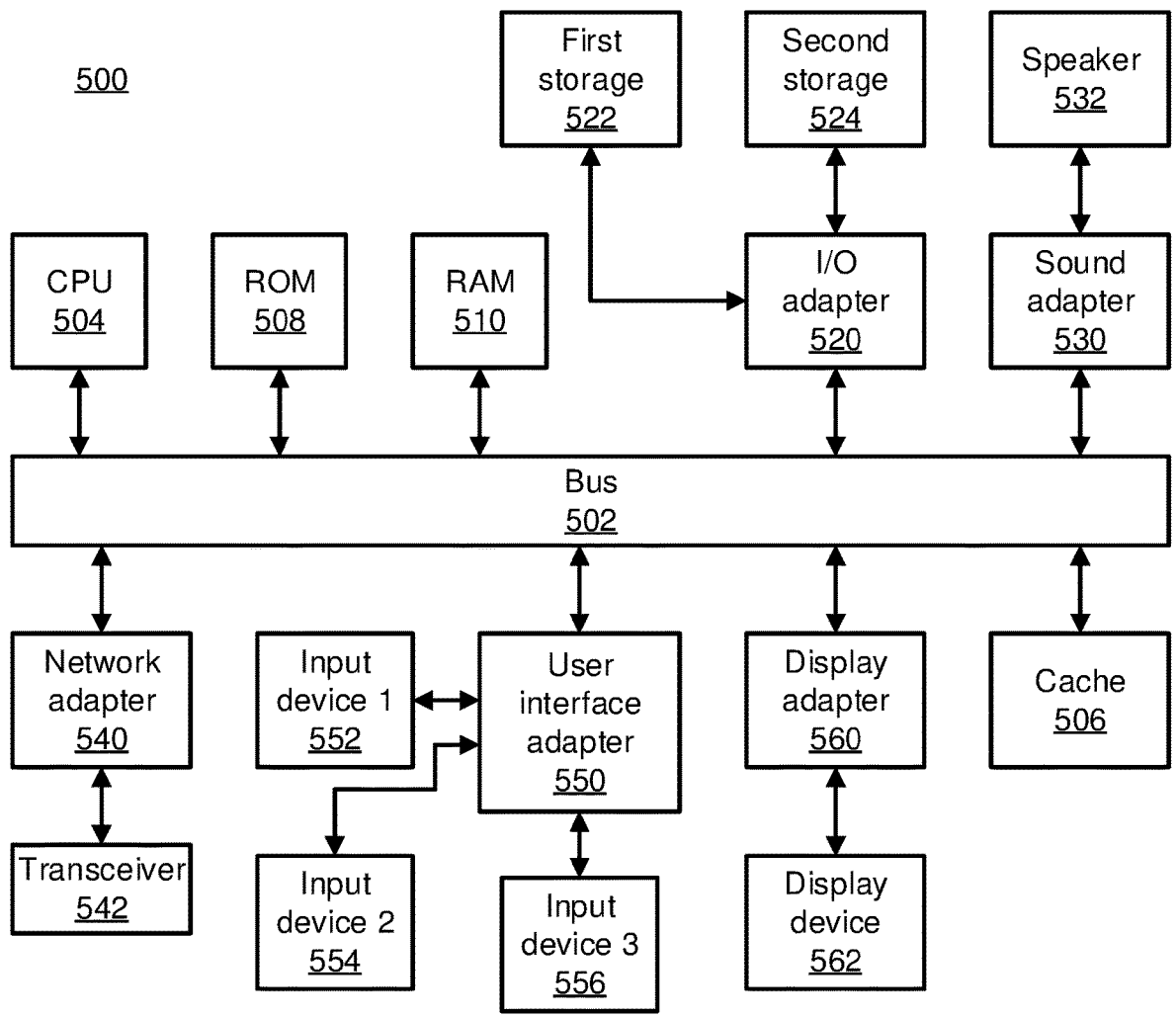
FIG. 5 is a block diagram of a processing system in accordance with an embodiment of the present invention.

Referring now to FIG. 5, an exemplary processing system 500 is shown which may represent the power access system 308. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for power management, comprising:
   determining a demand threshold by solving an optimization problem that minimizes peak demand charges and maximizes a usable lifetime for a power storage system; and
   providing power to a load from an electrical grid when the load is below the demand threshold and from a combination of the electrical grid and the power storage system when the load is above the demand threshold.

2. The method of claim 1, wherein the optimization problem comprises a peak demand charge term, an average state of charge term, and an accumulated discharged energy term.

3. The method of claim 2, wherein the optimization problem is defined as:

$$\min \sum_{i=1}^{T} \alpha[AvgSoC^i] + \beta[AADE^i] +$$

$$\gamma[DC_{rate}^{any} \cdot P\max_{grid}^{any} + DC_{rate}^{peak} \cdot P\max_{grid}^{peak} + DC_{rate}^{partial} \cdot P\max_{grid}^{partial}]$$

where $\alpha$, $\beta$, and $\gamma$ are weighting parameters that that are set in accordance with a particular optimization method, T represents the number of days in a given month, while i represents a particular day of the month, $AvgSoC^i$ represents the $i^{th}$ average state of charge, $AADE^i$ represents the $i^{th}$ annual average discharged energy, $DC_{rate}$ refers to the demand cost at various periods of the day, $P\max_{grid}$ refers to the maximum value of the demanded power from the grid at various periods of the day, "any" refers to any time of day, "peak" refers to peak demand periods during the day, and "partial" refers to partial peak periods of the day.

4. The method of claim 1, wherein the optimization problem is solved in a combined manner that optimizes the peak demand charges and maximizes the usable lifetime at the same time.

5. The method of claim 1, wherein the optimization problem is solved in a cascaded manner that optimizes the peak demand charges first and then optimizes the usable lifetime in view of a fixed peak demand charge value.

6. The method of claim 1, wherein determining the demand threshold is performed periodically, with provision of power being based on a latest demand threshold.

7. The method of claim 6, wherein the demand threshold is determined monthly.

8. The method of claim 1, wherein determining the demand threshold comprises calculating per-day demand thresholds for a plurality of recorded earlier days and selecting a representative demand threshold value.

9. The method of claim 1, wherein the optimization problem is solved subject to a constraint on annual average discharged energy and demand charges.

10. A computer-implemented method for power management, comprising:
    determining a monthly demand threshold by solving an optimization problem, having a peak demand charge term, an average state of charge term, and an accumulated discharged energy term, that minimizes peak demand charges and maximizes a usable lifetime for a battery system; and
    providing power to a load from an electrical grid when the load is below the monthly demand threshold and from a combination of the electrical grid and the battery system when the load is above the monthly demand threshold.

11. A power access system, comprising:
    a monthly demand module configured to determine a demand threshold by solving an optimization problem that minimizes peak demand charges and maximizes a usable lifetime for a power storage system; and
    a grid access controller configured to provide power to a load from an electrical grid when the load is below the demand threshold and from a combination of the electrical grid and the power storage system when the load is above the demand threshold.

12. The power access system of claim 11, wherein the optimization problem comprises a peak demand charge term, an average state of charge term, and an accumulated discharged energy term.

13. The power access system of claim 12, wherein the power storage system is battery-based.

14. The power access system of claim 11, wherein monthly demand module is configured to solve the optimization problem in a combined manner that optimizes the peak demand charges and maximizes the usable lifetime at the same time.

15. The power access system of claim 11, wherein monthly demand module is configured to solve the optimization problem in a cascaded manner that optimizes the peak demand charges first and then optimizes the usable lifetime in view of a fixed peak demand charge value.

16. The power access system of claim 11, wherein monthly demand module is configured to determine the demand threshold periodically, with provision of power being based on a latest demand threshold.

17. The power access system of claim 16, wherein the demand threshold is determined monthly.

18. The power access system of claim 11, wherein the monthly demand threshold is configured to calculate per-day demand thresholds for a plurality of recorded earlier days and to select a representative demand threshold value.

19. The power access system of claim 11, wherein the optimization problem is solved subject to a constraint on annual average discharged energy and demand charges.

20. The power access system of claim 11, wherein the optimization problem is defined as:

$$\min \sum_{i=1}^{T} \alpha[AvgSoC^i] + \beta[AADE^i] + \gamma\left[DC_{rate}^{any} \cdot P\max_{grid}^{any} + DC_{rate}^{peak} \cdot P\max_{grid}^{peak} + DC_{rate}^{partial} \cdot P\max_{grid}^{partial}\right]$$

where $\alpha$, $\beta$, and $\gamma$ are weighting parameters that that are set in accordance with a particular optimization method, T represents the number of days in a given month, while i represents a particular day of the month, $AvgSoC^i$ represents the $i^{th}$ average state of charge, $AADE^i$ represents the $i^{th}$ annual average discharged energy, $DC_{rate}$ refers to the demand cost at various periods of the day, $P\max_{grid}$ refers to the maximum value of the demanded power from the grid at various periods of the day, "any" refers to any time of day, "peak" refers to peak demand periods during the day, and "partial" refers to partial peak periods of the day.

* * * * *